US008565727B2

(12) United States Patent
Lindner

(10) Patent No.: US 8,565,727 B2
(45) Date of Patent: Oct. 22, 2013

(54) COMMUNICATION SESSION PERMISSIONS IN WIRELESS COMMUNICATION SYSTEMS

(75) Inventor: Mark A. Lindner, Superior, CO (US)

(73) Assignee: QUALCOMM Incorporated, San Diego, CA (US)

(*) Notice: Subject to any disclaimer, the term of this patent is extended or adjusted under 35 U.S.C. 154(b) by 260 days.

(21) Appl. No.: 12/720,325

(22) Filed: Mar. 9, 2010

(65) Prior Publication Data

US 2010/0248691 A1 Sep. 30, 2010

Related U.S. Application Data

(60) Provisional application No. 61/164,274, filed on Mar. 27, 2009.

(51) Int. Cl.
*H04M 7/00* (2006.01)
*H04M 3/42* (2006.01)
*G06F 15/16* (2006.01)
*H04L 12/66* (2006.01)

(52) U.S. Cl.
USPC ............... 455/411; 379/220.01; 379/201.02; 709/228; 370/352

(58) Field of Classification Search
USPC .............. 455/411; 379/220.01; 709/228
See application file for complete search history.

(56) References Cited

U.S. PATENT DOCUMENTS

| 7,031,447 | B2* | 4/2006 | Mani ..................... 379/201.06 |
| 7,242,680 | B2* | 7/2007 | Gallant ........................ 370/352 |
| 7,792,973 | B2* | 9/2010 | Gallant et al. ............... 709/228 |
| 2003/0013461 | A1 | 1/2003 | Mizune et al. |
| 2003/0156696 | A1 | 8/2003 | Brown et al. |
| 2004/0257979 | A1 | 12/2004 | Ro et al. |
| 2006/0093121 | A1* | 5/2006 | Sylvain ................. 379/220.01 |
| 2006/0165065 | A1* | 7/2006 | Lawrence-Apfelbaum .. 370/352 |
| 2006/0210032 | A1 | 9/2006 | Grech et al. |
| 2008/0031228 | A1* | 2/2008 | Gallant ........................ 370/352 |
| 2008/0051066 | A1 | 2/2008 | Bandhole et al. |
| 2009/0279681 | A1* | 11/2009 | Mckee et al. ............ 379/201.02 |
| 2010/0151885 | A1* | 6/2010 | Buford et al. ............... 455/456.3 |
| 2010/0246468 | A1* | 9/2010 | Santhanam et al. .......... 370/312 |

FOREIGN PATENT DOCUMENTS

| EP | 0818915 | 1/1998 |
| JP | 2002084569 A | 3/2002 |
| JP | 2003047043 A | 2/2003 |
| JP | 2003219467 A | 7/2003 |

(Continued)

OTHER PUBLICATIONS

International Search Report and Written Opinion—PCT/US2010/028645, International Search Authority—European Patent Office—Sep. 14, 2010.

*Primary Examiner* — Kent Chang
*Assistant Examiner* — Ngan Pham Lu
(74) *Attorney, Agent, or Firm* — Raphael Freiwirth

(57) ABSTRACT

Systems, apparatuses and methods of determining whether to permit a call to an access terminal are disclosed. A second party is determined to be available for a communication session between a first party and the second party. Location information associated with a call permissions rule set is obtained, where the call permissions rule set includes at least one rule related to whether a communication session between the first and second parties is permissible. Further, at least one rule includes one or more location-based rules. Location information is obtained that is associated with the second party. Then, it is determined whether to permit the communication session based on the obtained location information associated with the call permissions rule set and the obtained location information associated with the second party.

78 Claims, 8 Drawing Sheets

(56) References Cited

FOREIGN PATENT DOCUMENTS

| | | |
|---|---|---|
| JP | 2004159064 A | 6/2004 |
| JP | 2007006288 A | 1/2007 |
| JP | 2007124562 A | 5/2007 |
| JP | 2007129359 A | 5/2007 |
| JP | 2008085977 A | 4/2008 |
| JP | 2008515270 A | 5/2008 |
| JP | 2008177833 A | 7/2008 |
| WO | WO2004077797 | 9/2004 |
| WO | WO2005083995 | 9/2005 |
| WO | 2006043791 A1 | 4/2006 |

* cited by examiner

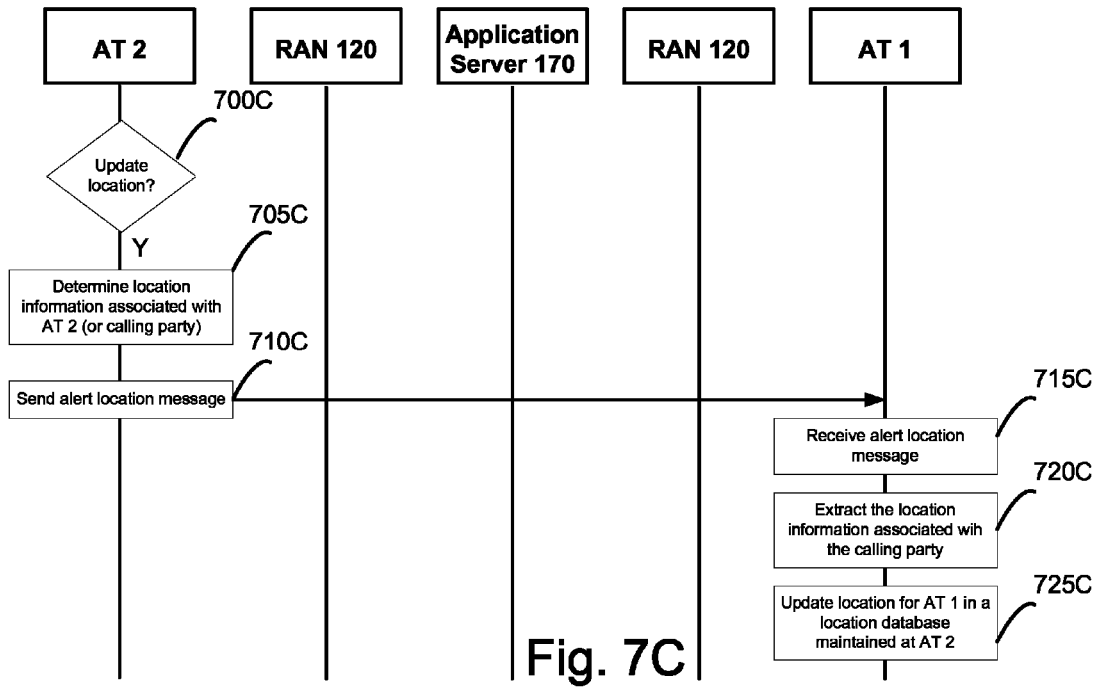
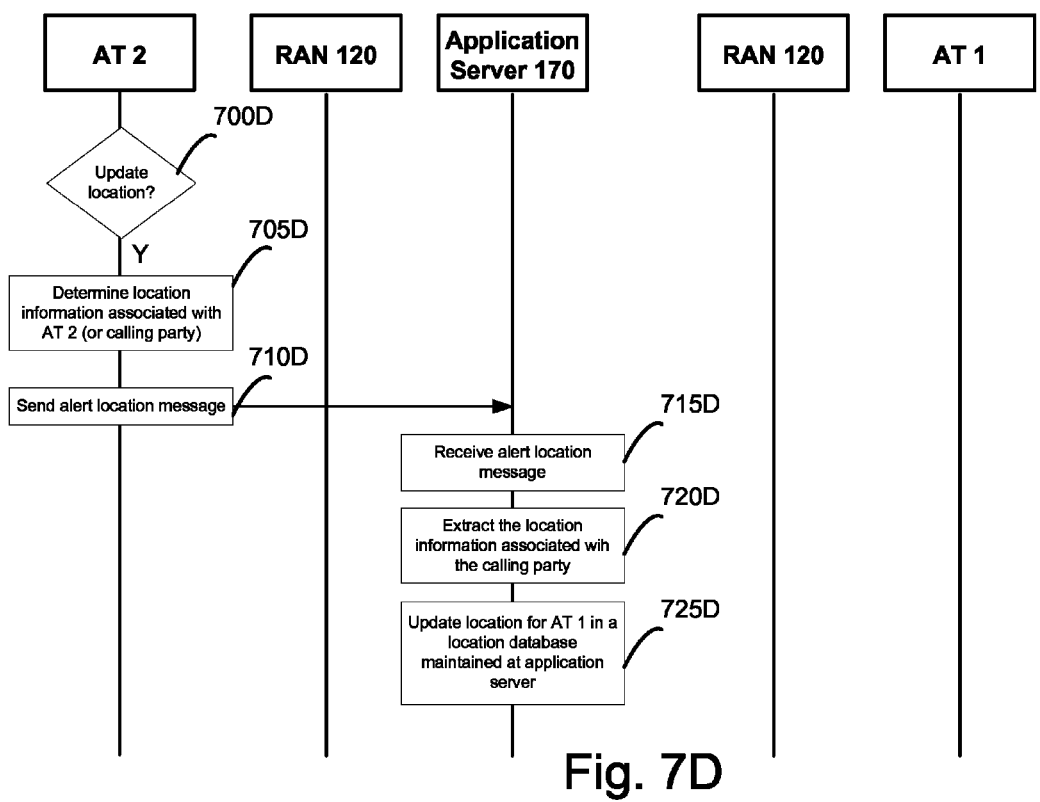

COMMUNICATION SESSION PERMISSIONS IN WIRELESS COMMUNICATION SYSTEMS

CLAIM OF PRIORITY UNDER 35 U.S.C. §119

The present application for patent claims priority to Provisional Application No. 61/164,274 entitled "COMMUNICATION SESSION PERMISSIONS IN WIRELESS COMMUNICATION SYSTEMS" filed Mar. 27, 2009, and assigned to the assignee hereof and hereby expressly incorporated by reference herein.

BACKGROUND OF THE INVENTION

1. Field of the Invention

Embodiments of the present invention are directed to determining whether to permit a communication session between two or more parties within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1 x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments include systems, apparatuses and methods of determining whether to permit a call to an access terminal. A second party is determined to be available for a communication session between a first party and the second party. Location information associated with a call permissions rule set is obtained, where the call permissions rule set includes at least one rule related to whether a communication session between the first and second parties is permissible. Further, at least one rule includes one or more location-based rules. Location information is obtained that is associated with the second party. Then, it is determined whether to permit the communication session based on the obtained location information associated with the call permissions rule set and the obtained location information associated with the second party.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIGS. 7C and 7D illustrate location reporting processes performed prior to call initiation according to embodiments of the present invention.

DETAILED DESCRIPTION

Figure 1:
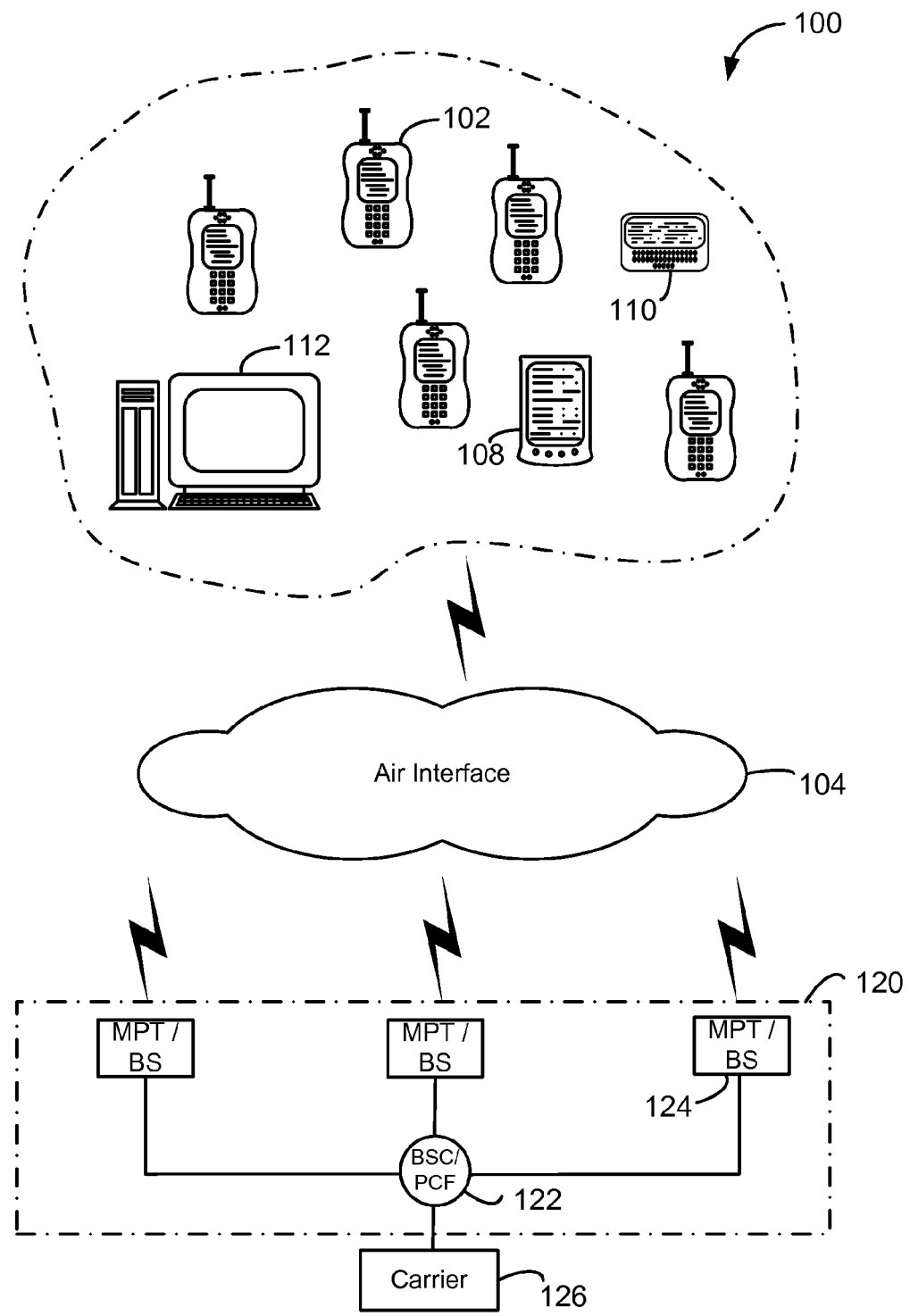
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
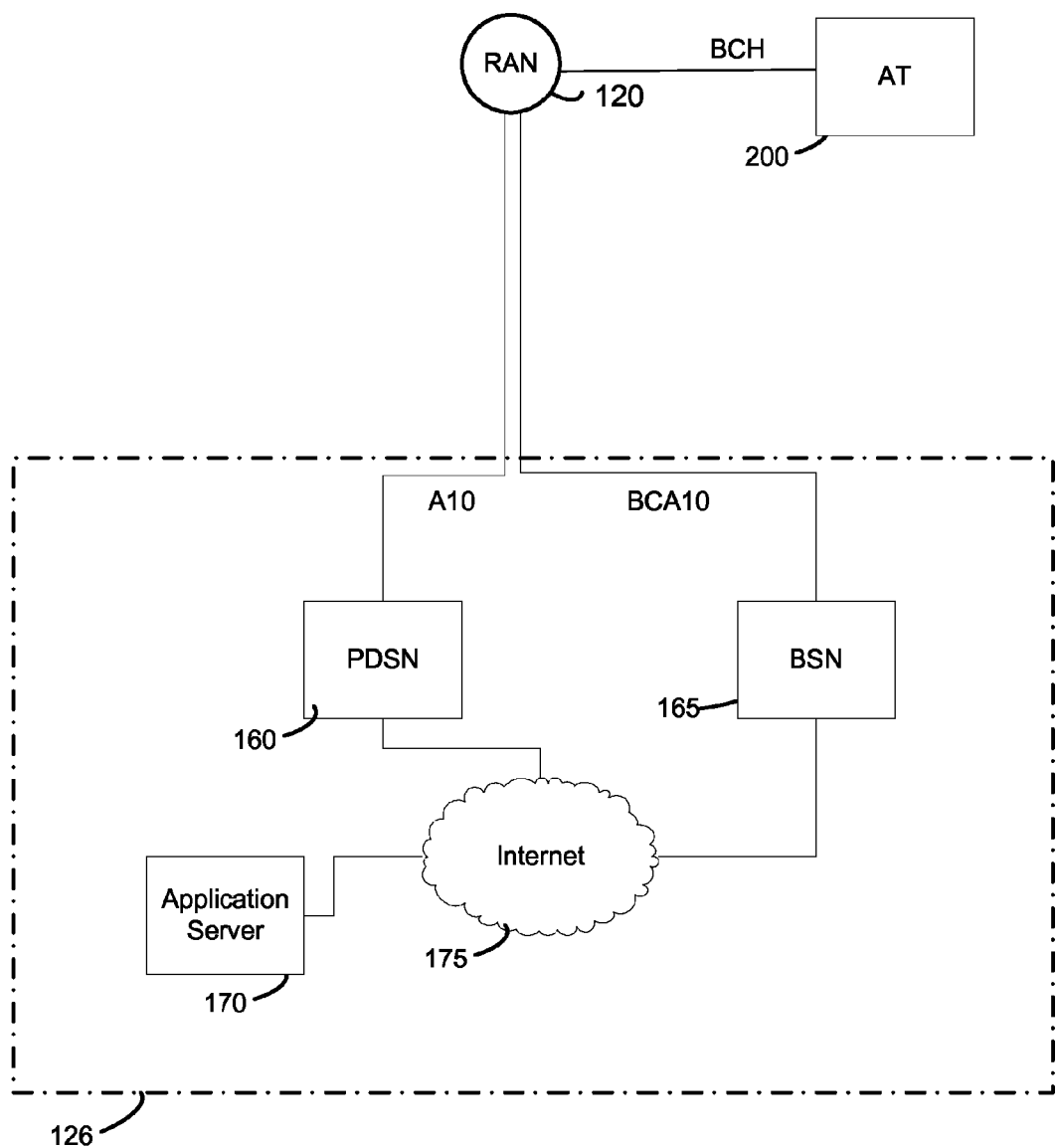
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
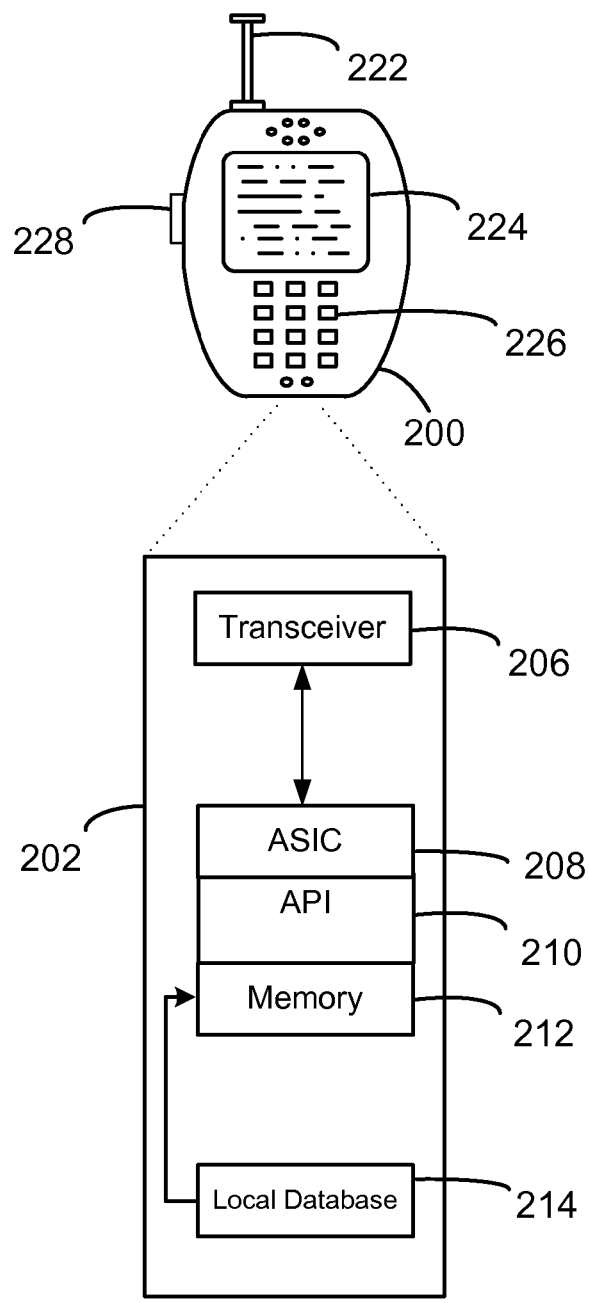
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations.

Accordingly, the illustrations provided herein are not intended to limit the embodiments of the invention and are merely to aid in the description of aspects of embodiments of the invention.

Conventional Call Permission

Below, a description of conventional call permission enforcement is described, followed by call permission enforcement according to embodiments of the present invention.

Figure 4:
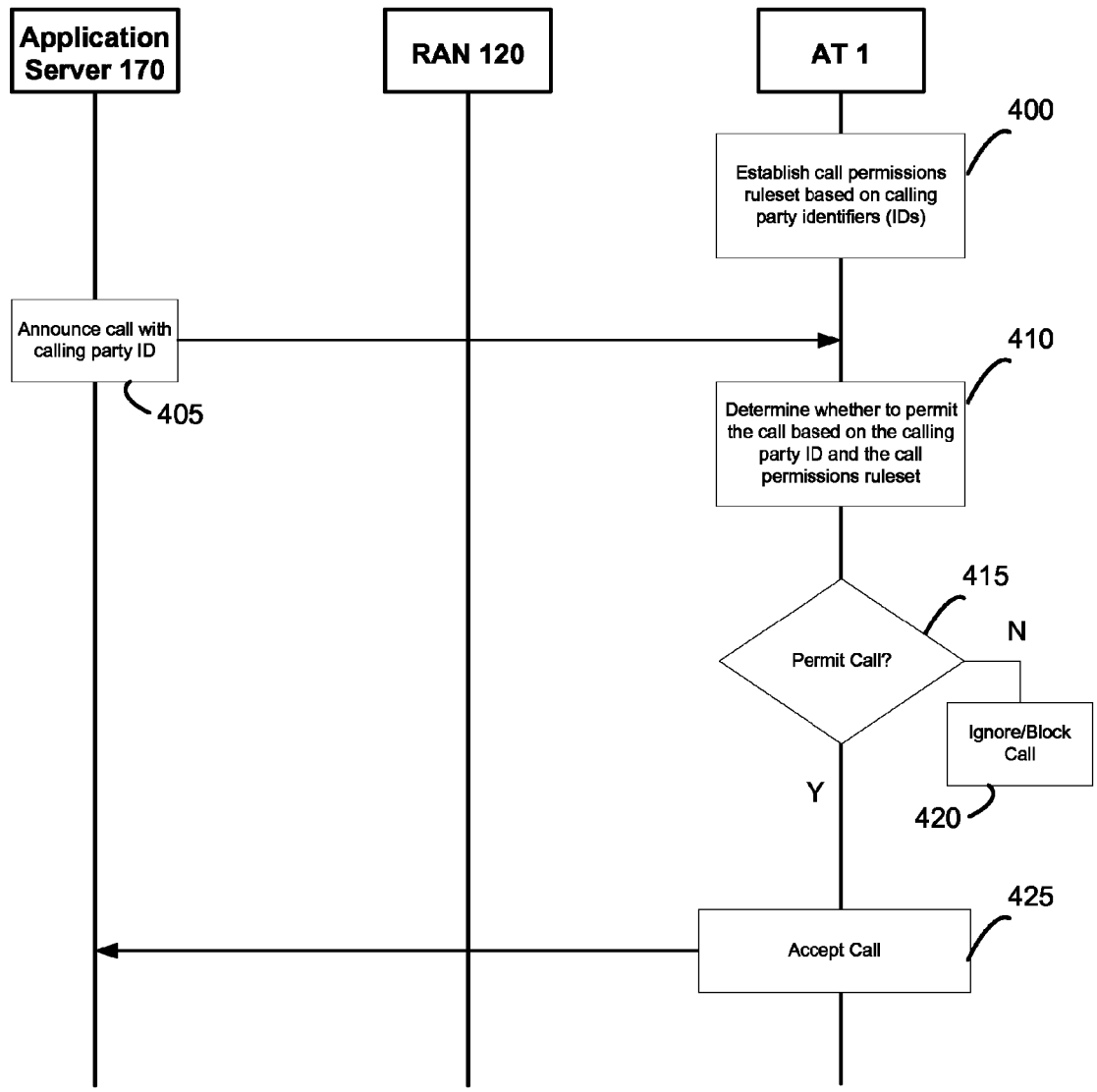
FIG. 4 illustrates a conventional call permission process.

FIG. 4 illustrates a conventional call permission process. Referring to FIG. 4, in 400, a given AT ("AT 1") establishes a call permissions rule set based on calling party identifiers (IDs). For example, calling party identifiers can include phone numbers, email addresses, names and/or any other manner by which AT 1 can identify a calling party. For example, AT 1 can establish a call permissions rule set that includes a list of calling party IDs that are permitted to call AT 1, and a list of calling party IDs that are not permitted to call AT 1. The call permissions rule set can associate time with the listed calling party IDs, such that one or more calling party IDs are only permitted to call during business hours, one or more other calling party IDs are permitted to call anytime, etc. While not described with respect to FIG. 4, the call permissions rule set can also be based on time in place of calling party IDs (e.g., "no calls between midnight and 6 am").

In 405, the application server 170 announces a call with a call announcement message (e.g., a PTT or PTX call announce message) that includes a calling party ID of the call initiator (e.g., a PTT initiator, a PTX initiator, a unicast call initiator, etc.). The announced call can be for a unicast call, or a multicast call. In other words, while the application server 170 is described above with respect to FIGS. 1, 2 and 3 as being a multicast server, the application server 170 may alternatively correspond to a unicast server.

AT 1 receives the call announcement message from the application server 170, and determines whether to permit the call based on the calling party ID of the calling party and the call permissions rule set, 410. For example, AT 1 compares the calling party ID received with the call announcement message in 405 with the listed calling party IDs in the call permissions rule set established in 400. If AT 1 finds a matching calling party ID, AT 1 next determines the call permissions associated with the matching calling party ID to determine whether the call can be permitted.

In 415, if AT 1 determines not to permit the call, AT 1 blocks or ignores the call announcement message, 420. For example, in 420, AT 1 drops the call announcement packet such that AT 1 is not aware that the call was ever announced. Alternatively, in another example, AT 1 can be notified that the call announcement message was received and rejected, pursuant to the call permissions rule set. Otherwise, if AT 1 determines to permit the call, the process of FIG. 4 advances to 425.

In an example, in 425, AT 1 notifies a user of AT 1 of the call announcement message (e.g., prompts the user for an accept/reject indication), and the user can then determine whether to accept the call. In this example, if the call is determined to be permitted by the call permissions rule set in 415, the user still has the option to overrule the call permissions rule set and reject the call. Alternatively, in another example, AT 1 may automatically accept the call in 425 without first obtaining user permission. Irrespective of the manner by which calls are accepted, 425 of FIG. 4 assumes that AT 1 accepts the call.

As will be appreciated by one of ordinary skill in the art, the call permissions rule set used to determine call permissions in FIG. 4 has some flexibility with regard to calling party ID, time-parameters, etc. However, conventional call permissions rule sets do not include location criteria associated with a calling party as a factor in determining call permissions. Accordingly, embodiments of the invention, described below, are directed to determining whether to permit a call based at least in part upon location criteria associate with a calling party.

Location-Based Call Permission According to Embodiments of the Present Invention As will now be described in greater detail, embodiments of the invention, described below, are directed to determining whether to permit a call based at least in part upon location information associated with a calling party. While the examples provided below are described in, in some instances, with respect to multicast calls (e.g., push-to-talk (PTT) calls, push-to-transfer (PTX) calls, QChat calls, etc.) where the application server 170 is embodied as a multicast server, it will be appreciated that other embodiments of the present invention can be directed to unicast calls.

As used herein, "location information" is intended to be interpreted broadly, and can be indicative of a geographic range or area (e.g., a sector, or other geographic partition), a geographic coordinate, a street or address (e.g., "$80^{th}$ E. Avenue", "1773 oak farm crossing, Oakton, Va.", etc.), a building (e.g., "Shea Stadium", "The Empire State Building", etc.) and/or any other metric that can be used to indicate location.

Figure 5:
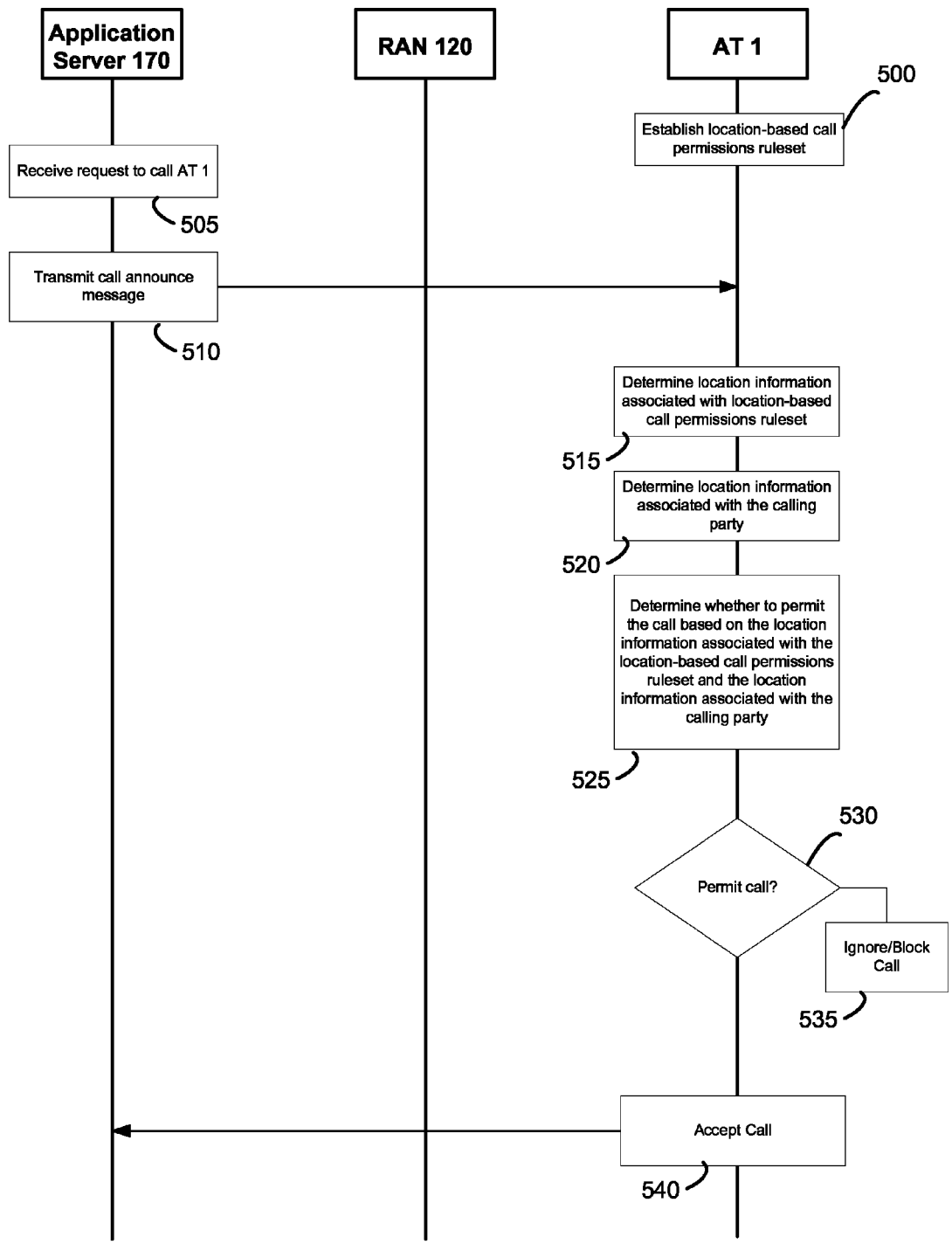
FIG. 5 illustrates a location-based call permissions process according to an embodiment of the present invention.

FIG. 5 illustrates a location-based call permissions process according to an embodiment of the present invention. Referring to FIG. 5, in 500, a given AT ("AT 1") establishes a location-based call permissions rule set. As discussed above in FIG. 4, a conventional call permissions rule set may include criteria such as calling party ID, time of call and/or other factors, but does not take into account location information associated with the calling party.

In an example, the location-based call permissions rule set can include "global" location-based call permissions rules that apply to all calling parties, or can include more selective location-based call permissions rules that apply to less than all calling parties. For example, a first location-based call permissions rule can be applied to a first set of calling parties (e.g., "Business Contacts", etc.), a second location-based call permissions rule can be applied to a second set of calling parties (e.g., "Family Contacts", etc.) and a non-location-based call permissions rule (e.g., such as a conventional calling party ID or time-based rule) can be applied to a third set of calling parties (e.g., "Emergency Contacts", etc.). Table 1 (below) illustrates a number of location-=based call permissions rule examples.

TABLE 1

Examples of Location-Based Call Permissions Rules

| Rule # | Rule Description |
|---|---|
| 1 | Only permit calls from calling parties within 5 miles from a given sports arena for the duration of a given sporting event. |
| 2 | Do not permit calls from calling parties within 2 miles from a given hotel for the duration of a convention of the given hotel. |
| 3 | Only permit calls from calling parties within 7 miles from my current position. |
| 4 | Only permit calls from calling parties within the same sector as me. |

TABLE 1-continued

Examples of Location-Based Call Permissions Rules

| Rule # | Rule Description |
|---|---|
| 5 | Do not permit calls from calling parties within a building at which I am currently located. |
| 6 | Only permit calls from people that are in my same building. |

Referring to Table 1 (above), a number of different rule examples are provided. One or more of the listed rules may be included within a location-based call permissions rule set, in an example. Also, the scope of the rules may be controlled by a user of AT 1. For example, if the location-based call permissions rule set includes Rules #1 and #2, Rule #1 may apply to calling parties A, B and C, and Rule #2 may apply to calling parties D, E and F (e.g., where A, B and C correspond to a first type of contact, such as business contact, and D, E and F correspond to a different type of contact). In a further example, the scope of some rules may be limited to unicast calls, while the scope of other rules may be limited to multicast calls. In further examples, rules can be specific to group calls, or non-group calls. Accordingly, it will be appreciated that the scope of the rule(s) are fully customizable by the user.

Again referring to Table 1, Rule #1 sets forth a rule that only calls from calling parties within 5 miles from a given sports arena for the duration of a given sporting event (e.g., a baseball game, a football game, etc.) are permitted. As will be appreciated, to evaluate whether this rule is satisfied (at 525/530, below), AT 1 must know (i) the location of the calling party, (ii) the location of the given sports arena, (iii) the time-span of the sporting event and (iv) a current time. It will be appreciated that, without the "duration" aspect of Rule #1, (iii) and (iv) would not be required to evaluate the rule. Rule #2 is similar to Rule #1 in certain aspects, except call announcements satisfying Rule #2 indicate calls that are blocked (i.e., instead of permitted). Rule #3 differs from Rules #1 and #2 because Rule #3 relates to a current position of AT 1, and not a fixed position (e.g., the sporting arena in Rule $\#_1$ and the hotel in Rule #2 are fixed). Rule #4 is associated with location information related to AT 1's current serving sector, and a current serving sector of a calling party. Rule #5 is associated with location information related to a building that currently houses AT 1 (e.g., which may require a building recognition in addition to a mere geographic location estimate). Similar to Rule#5, Rule #6 is also associated location information related to both AT 1's current address (or other building designation), as well as the address or building designation of the calling party. As will be appreciated, the location types of the "current position" of the calling party or AT 1 in Table 1 (above) can correspond to any type of location information as defined above (e.g., a geographic range or area such as a sector or geographic coordinate range, a geographic coordinate, a street or address, a building, etc., and/or any other metric that can be used to indicate location).

Rules #1-#6 are intended to demonstrate examples of the different potential location-based call permissions rules that may be established by a user of AT 1. However, it will be appreciated that, in other embodiments of the invention, different rules and/or different combinations of rules may be included within the location-based call permissions rule set. Also, while each rule example in Table 1 includes at least one location criterion, in other embodiments of the invention the location-based call permission rule set can include one or more rules that do not include a location criterion. Also, while not illustrated in Table 1, it is possible for AT 1 to establish one or more calling parties (e.g., emergency contacts) that will always be permitted, irrespective of restrictions set forth by the location-base call permissions rule set.

Further, while not discussed in detail above, AT 1 may not necessarily have the information required to evaluate one or more rules in the rule set (e.g., for Rule #2, the location of the given hotel may not be known, etc.). In this example, a default permission setting (e.g., always permit, always block, etc.) may be established for calls that cannot be evaluated by the rule set. Hereinafter, it may be assumed for the processes of FIGS. 5 and 6 for the sake of convenience that AT 1 can evaluate any location-based rule. Examples of how AT 1 may acquire the requisite location information to evaluate location-based rules are discussed in more detail below with respect to FIGS. 7A-7D.

Returning to FIG. 5, in 505, at some point after the location-based call permissions rule set is established in 500, assume that the application server receives a request to call AT 1 (e.g., for a unicast call, a multicast call, etc.). In 510, the application server 170 forwards an announce message (e.g., a PTT or PTX call announce message) to the RAN 120, which transmits the announce message to AT 1 (e.g., as a data-over-signaling (DOS) message on a control channel (CCH), via a standard paging process, etc.). AT 1 receives the announce message transmitted in 510, and determines location information associated with the location-based call permissions rule set, 515. In other words, in 515, AT 1 acquires the location information by which to determine whether to permit the announced call (e.g., the qualifying location information), based on one or more rules included within the location-based call permissions rule set (e.g., the disqualifying location information). For example, assume that the location-based call permissions rule set for AT 1 includes Rule #1 from Table 1 (above) (Rule #1—"Only permit calls from calling parties within 5 miles from a given sports arena for the duration of a given sporting event"). In this example, the location information determined in 515 corresponds to a five-mile radius zone surrounding the given sports arena (e.g., based on a geographic location or the arena as determined by a satellite positioning system (SPS) such as the global positioning system (GPS), a geographic zone or range based on GPS, etc., which can be acquired in advance from an Internet site, manually entered by the user, etc.). While not location-information, the time-span or duration of the given sporting event can also be acquired in 515 (e.g., 5:00 PM —8:00 PM EST on Monday), along with a current time (e.g., a time at which the announce message is received). In another example, if the location-based call permissions rule set includes Rule #3 or Rule #5 from Table 1, then a current position of AT 1 would also be determined (e.g., based on GPS, a hybrid GPS/cellular positioning technique, triangulation, etc.).

In 520, AT 1 determines location-information associated with the calling party. For example, for Rule #1, this can include determining a geographic location (e.g., computed by GPS, triangulation, etc.) of the calling party. For Rule #5, this includes determining whether the calling party is located within a building, etc. In 525, AT 1 determines whether to permit the call based on the location information associated with the location-based call permissions rule set and the location information associated with the calling party. For example, the location information determined in 515 can be compared with the location information determined in 520 to determine whether one or more rules of the location-based call permissions rule set permit the call to proceed.

In 530, if AT 1 determines not to permit the call, AT 1 blocks or ignores the call announcement message, 535. For example, in 535, AT 1 drops the call announcement packet such that AT 1 is not aware that the call was ever announced.

Alternatively, in another example, AT 1 can be notified that the call announcement message was received and rejected, pursuant to the call permissions rule set. Otherwise, if AT 1 determines to permit the call, the process of FIG. 5 advances to 540.

In an example, in 540, AT 1 notifies a user of AT 1 of the call announcement message, and the user can then determine whether to accept the call. In this example, if the call is determined to be permitted by the call permissions rule set in 525/530, the user still has the option to overrule the call permissions rule set and reject the call. Alternatively, in another example, AT 1 may automatically accept the call in 540 without first obtaining user permission. Irrespective of the manner by which calls are accepted, 540 of FIG. 5 assumes that AT 1 accepts the call.

As will be appreciated by one of ordinary skill in the art, establishing call permissions rule sets that take into account one or more location criteria grant more control to a user of an AT regarding when and where calls are permitted or restricted. Further, while the enforcement of the location-based call permission rule set is performed at the AT in the process of FIG. 5, it will be appreciated that other embodiments of the invention may enforce the rule set at other network entities, such as the application server 170, as will now be described with respect to FIG. 6.

Figure 6:
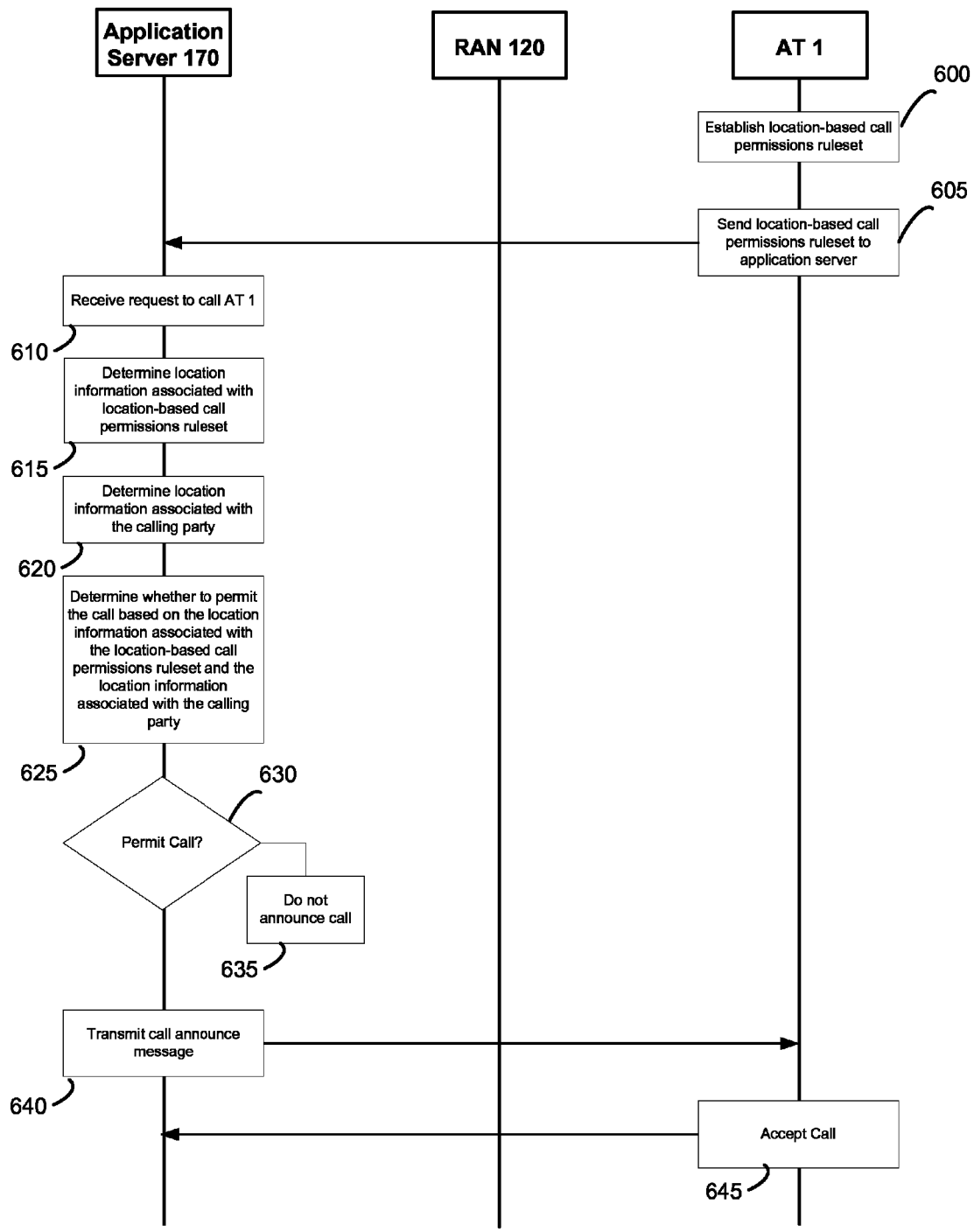
FIG. 6 illustrates another location-based call permissions process according to an embodiment of the present invention.

FIG. 6 illustrates another location-based call permissions process according to an embodiment of the present invention. Referring to FIG. 6, in 600, a given AT ("AT 1") establishes a location-based call permissions rule set. 600 of FIG. 6 corresponds to 500 of FIG. 5, which has already been discussed in detail above. Accordingly, a further description of 600 has been omitted for the sake of brevity.

After establishing the location-based call permissions rule set in 600, AT 1 sends the rule set to the application server 170, which maintains one or more rule sets for access terminals within the wireless communications system 100, 605. At some point after receiving the location-based call permissions rule set, the application server 170 receives a request to call AT 1 (e.g., for a unicast call, a multicast call, etc.). In 615, the application server 170 determines location information associated with the location-based call permissions rule set, and in 620, the application server 170 determines location-information associated with the calling party. 615 and 620 of FIG. 6 generally correspond to 515 and 520 of FIG. 5, respectively, except 615 and 620 are performed at the application server 170 whereas 515 and 520 of FIG. 5 are performed at AT 1. Accordingly, a further description of 615 and 620 has been omitted for the sake of brevity.

In 625, the application server 170 determines whether to permit the call (e.g., from the application server's 170 standpoint, this means whether to announce the call) based on the location information associated with the location-based call permissions rule set and the location information associated with the calling party. For example, the location information determined in 615 can be compared with the location information determined in 620 to determine whether one or more rules of the location-based call permissions rule set permit the call to proceed.

In 630, if the application server 170 determines not to permit the call, the application server 170 does not announce the call to AT 1, 630. However, as will be appreciated by one of ordinary skill in the art, if the call to be announced is a multicast call, the call announce message may still be transmitted in AT 1's sector, such that the call is still announced to AT 1. In this case, 635 should be interpreted as indicating that AT 1 is not factored into the decision regarding the sectors which will announce the multicast session. Otherwise, if the application server 170 determines to permit the call, the application server 170 sends the call announce message to AT 1, 640. In 645, assume that AT 1 sends a message that indicates an acceptance of the announced call. In an example, in 645, AT 1 notifies a user of AT 1 of the call announcement message, and the user can then determine whether to accept the call. In this example, the user still has the option to overrule the call permissions rule set and reject the call. Alternatively, in another example, AT 1 may automatically accept the call in 645 without first obtaining user permission. Irrespective of the manner by which calls are accepted, 645 of FIG. 6 assumes that AT 1 accepts the call.

While the processes of FIGS. 5 and 6, as described above, assume that the location information associated with the calling party can be determined at the target AT or AT 1 (520) and/or the application server 170 (620), it will be appreciated that ATs are not necessarily aware of the locations of ATs that call them. Accordingly, FIGS. 7A through 7D have been provided to demonstrate a number of different ways a calling party or AT ("AT 2") may convey its location information to the application server 170 and/or one or more target ATs (e.g., such as AT 1).

Figure 7A:
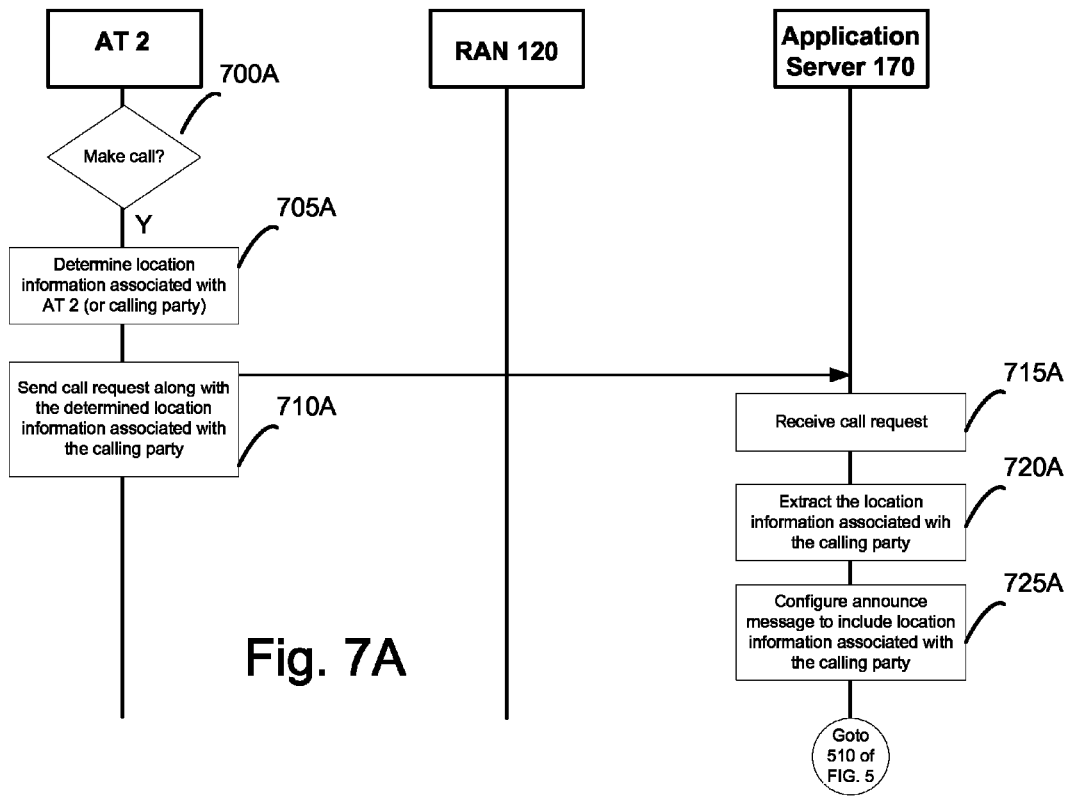
FIGS. 7A and 7B illustrate location reporting processes performed during call initiation according to embodiments of the present invention.

FIG. 7A illustrates a location reporting process performed during call initiation according to an embodiment of the present invention. Referring to FIG. 7A, in 700A, AT 2 determines whether to call at least AT 1 (e.g., as a single intended target in a unicast call, as one AT among many ATs in a multicast call, etc.). Assuming AT 2 determines to call AT 1 in 700A, AT 2 determines its location information, 705A. For example, the location information determined for AT 2 can include a GPS location, a building or address, etc (e.g., the type of location information can be determined in advance so as to conform with qualifying location information set forth in AT 1's call permissions rule set). Next, in 710A, AT 2 sends a call request that requests a call to be initiated with at least AT 1 to the application server 170. Also in 710A, AT 2 sends, to the application server 170, the determined location information from 705A. The application server 170 receives the call request, 715A (e.g., as in 505 of FIG. 5), and extracts the location information associated with the calling party (i.e., AT 2), 720A. In 725A, the application server 170 configures the call announce message for AT 1 to include an indication of the location information included in the call request message received from AT 2 in 715A (e.g., as a separate packet sent along with the announce message, within the header portion of the announce message, etc.). After configuring the call announce message in 725A, the process advances to 510 of FIG. 5, where the configured call announce message is transmitted to AT 1. In this example, 520 of FIG. 5 determines the location information associated with the calling party based on the information included in the call announce message.

Figure 7B:
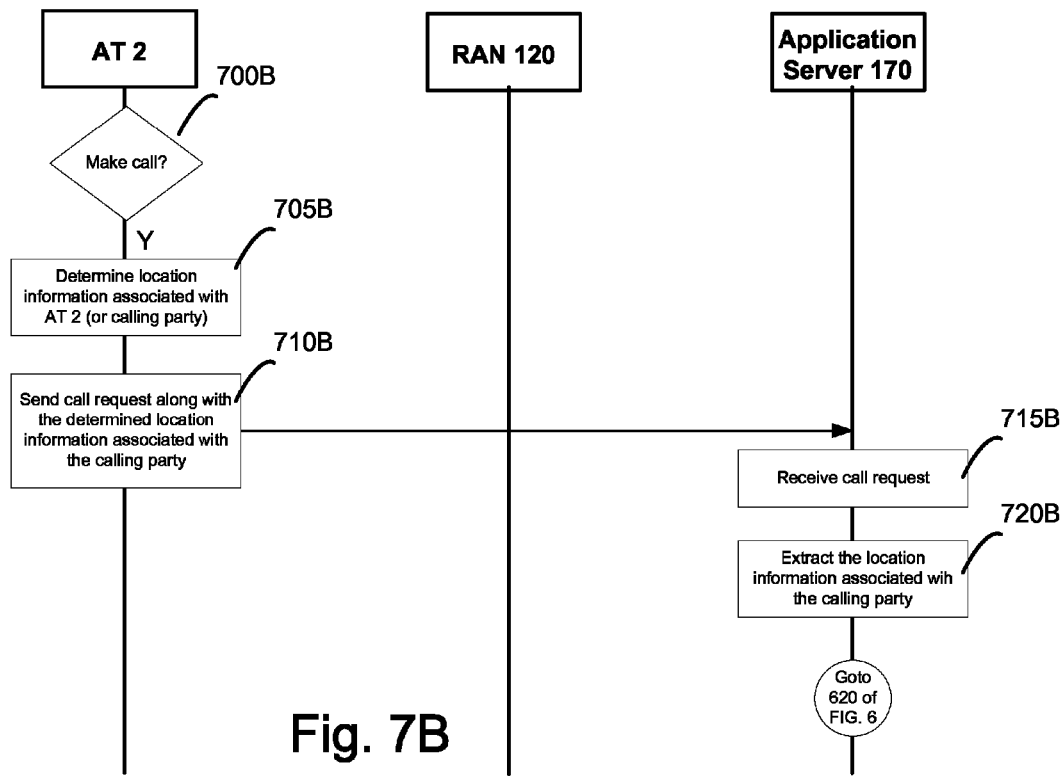

FIG. 7B illustrates another location reporting process performed during call initiation according to an embodiment of the present invention. Referring to FIG. 7B, in 700B, AT 2 determines whether to call at least AT 1 (e.g., as a single intended target in a unicast call, as one AT among many ATs in a multicast call, etc.). Assuming AT 2 determines to call AT 1 in 700B, AT 2 determines its location information, 705B. For example, the location information determined for AT 2 can include a GPS location, a building or address, etc. Next, in 710B, AT 2 sends a call request that requests a call to be initiated with at least AT 1 to the application server 170. Also in 710B, AT 2 sends, to the application server 170, the determined location information from 705B. The application server 170 receives the call request, 715B (e.g., as in 610 of FIG. 6), and extracts the location information associated with the calling party (i.e., AT 2), 720B (e.g., as in 620 of FIG. 6).

After determining the location information associated with the calling party in 720B (or 620 of FIG. 6), the process advances to 625 of FIG. 6.

FIG. 7C illustrates a location reporting process performed prior to call initiation according to an embodiment of the present invention. Referring to FIG. 7C, in 700C, assume that AT 1 maintains a location database that keeps track of the location of one or more ATs including AT 2, and that AT 2 determines whether to update its location entry in 700C. For example, if AT 1 belongs to a given multicast group including a plurality of multicast group members, each multicast group member may, at certain times (e.g., periodically, in response to a triggering even such as entering a new sector, handing off or crossing a given geographic threshold, etc.), send a PTX alert location message to each other multicast group member to indicate the updated location. Assuming AT 2 determines to update the location in 700C, AT 2 determines its location information, 705C. In 710C, AT 2 sends an alert location message (e.g., a PTX alert location message) indicating the determined location to at least AT 1 (e.g., and possibly other multicast group members if AT 2 updates its location for a given multicast group to which AT 2 belongs). AT 1 receives the alert location message, 715C, extracts the location information from the alert location message, 720C, and updates a location entry for AT 2 within the location database maintained at AT 1, 725C. Accordingly, in a subsequent execution of the process of FIG. 5, at 520, the location information associated with the calling party (e.g., AT 2) can be acquired by querying the location entry for AT 2 within the location database maintained at AT 1.

FIG. 7D illustrates another location reporting process performed prior to call initiation according to an embodiment of the present invention. Referring to FIG. 7D, in 700D, assume that the application server 170 maintains a location database that keeps track of the location of one or more ATs including AT 2, and that AT 2 determines whether to update its location entry in 700D. For example, if AT 1 belongs to a given multicast group including a plurality of multicast group members, each multicast group member may, at certain times (e.g., periodically, in response to a triggering even such as entering a new sector, handing off or crossing a given geographic threshold, etc.), send a PTX alert location message to the application server 170 to indicate the updated location. Assuming AT 2 determines to update the location in 700D, AT 2 determines its location information, 705D. In 710D, AT 2 sends an alert location message (e.g., a PTX alert location message) indicating the determined location to the application server 170. The application server 170 receives the alert location message, 715D, extracts the location information from the alert location message, 720D, and updates a location entry for AT 2 within the location database maintained at the application server 170, 725D. Accordingly, in a subsequent execution of the process of FIG. 6, at 620, the location information associated with the calling party (e.g., AT 2) can be acquired by querying the location entry for AT 2 within the location database maintained at the application server 170. Alternatively, in response to a call request as received 505, the application server 170 may include AT 2's location in the call announce message of 510 of FIG. 5, as described with respect to 725A (e.g., although in this example, the location information is obtained from the location database and not necessarily obtained from the call request itself, although AT 2 could update its location via the call request as well).

As will be appreciated, FIGS. 7A-7D illustrate different potential manners by which an entity that enforces a call permissions rule set (e.g., a called party such as AT 1, the application server 170, etc.) can obtain location information that enables the entity to evaluate the location-based rules contained in the rule set. However, embodiments of the present invention are not limited to these particular manners of obtaining the location information, and FIGS. 5 and 6, for example, can be implemented in any system where this information can be obtained in other embodiments of the present invention.

While embodiments of the invention above have generally been directed to calls, it will be appreciated that other embodiments of the invention may be directed to any type of communication session (e.g., a data transport session, a unicast call or session, a multicast call or session, a direct session between two session participants, etc.). Accordingly, as used herein, "call" is intended to be interpreted broadly so as to read upon any type of communicative contact to or from an access terminal, and is not necessarily limited to phone calls, for example, unless expressly indicated. For example, calls can include phone calls, video transfers, txt messages, etc.

Further, while embodiments have generally been given above with respect to determining whether to permit a call or communication session at a called party based on location information of a calling party, other embodiments can be directed to determining whether to permit a call or communication session at a calling party based on location information of the calling party itself. For example, assume that an employer issues a certain number of wireless phones to its employees to be used for work-purposes only. The employer provisions the wireless phones with location-restriction based software that only permits calls (or other types of communication sessions) to be made when the employees are within proximity to designated work areas. Thus, the employer can increase the likelihood that its employees only use their work-phones for work-related objectives by restricting communicative access to the work-phones to work-related areas.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of determining whether to permit a call to an access terminal of a first party, comprising:
   receiving a message for a communication session between the first party and a second party;
   obtaining location information associated with a call permissions rule set, the call permissions rule set including at least one rule related to whether the communication session between the first party and the second party is permissible, the at least one rule including one or more location-based rules;
   obtaining location information associated with the second party; and
   determining whether to permit the communication session with the access terminal of the first party based on the obtained location information associated with the call permissions rule set and the obtained location information associated with the second party,
   wherein the second party corresponds to a calling party.

2. The method of claim 1, wherein the communication session is one or more of a call, a data transport session, a unicast communication, a multicast communication, a direct session and a group communication session including three or more potential session participants.

3. The method of claim 1, wherein the location information associated with the second party is obtained from the received message.

4. The method of claim 1, wherein the location information associated with the second party is obtained from a location database.

5. The method of claim 4, further comprising:
   receiving one or more location updates from the second party that indicate location information associated with the second party; and
   updating the location database based on the received location updates.

6. The method of claim 5, wherein the received message includes a location update.

7. The method of claim 1, wherein the location information associated with the call permissions rule set corresponds to location criteria that is required to determine whether the at least one rule of the call permissions rule set is satisfied.

8. The method of claim 7, wherein the determining whether to permit the communication session compares the location information associated with the call permissions rule set with the location information associated with the second party to determine whether to permit the communication session.

9. The method of claim 1, wherein the location information associated with the second party includes one or more of a geographic coordinate of the second party, a building indicator at which the second party is located, or a geographic range that includes the second party and an address at which the second party is located.

10. The method of claim 1, wherein the location information associated with the call permissions rule set includes one or more of a geographic coordinate, a building indicator, or a geographic range and an address.

11. The method of claim 1, wherein the at least one rule indicates either to block or permit the communication session based on whether at least one criterion is satisfied.

12. The method of claim 1, wherein the call permissions rule set includes at least one rule that is not based on location.

13. The method of claim 1, wherein the one or more location-based rules include conditions related to second party position that, if met, result in the determining whether to permit the communication session to block or permit the call.

14. The method of claim 1, wherein at least one of the one or more location-based rules include at least one non-location criterion.

15. The method of claim 14, wherein the non-location criterion is time-based.

16. The method of claim 1, wherein the received message is a call announce message received at the first party.

17. The method of claim 16, wherein the receiving, the obtaining and the determining are performed at the first party.

18. The method of claim 16, wherein the received message originates from an application server.

19. The method of claim 18, wherein the received message is configured by the application server to convey the location information associated with the second party to the first party.

20. The method of claim 16, further comprising:
automatically accepting the communication session when the determining whether to permit the communication session determines to permit the communication session.

21. The method of claim 16, further comprising:
prompting a user to indicate whether the communication session is accepted when the determining whether to permit the communication session determines to permit the communication session.

22. The method of claim 16, further comprising:
blocking the communication session such that the communication session is not accepted when the determining whether to permit the communication session determines not to permit the communication session.

23. The method of claim 1, wherein the received message is a call message received from the second party at an application server.

24. The method of claim 23, wherein the receiving, the obtaining and the determining are performed at the application server.

25. The method of claim 23, wherein the call permissions rule set is received from the first party before the message is received.

26. The method of claim 23, further comprising:
transmitting an announce message that announces the communication session to the first party when the determining whether to permit the communication session determines to permit the communication session.

27. The method of claim 23, further comprising:
blocking a transmission of an announce message that announces the communication session to the first party when the determining whether to permit the communication session determines not to permit the communication session.

28. The method of claim 1, wherein the communication session corresponds to a call and the first party corresponds to a called party.

29. The method of claim 1, further comprising:
obtaining the call permission rule set including a condition corresponding to a set of calling parties.

30. The method of claim 29, further comprising:
determining if the second party is a member of the set of calling parties.

31. The method of claim 30, wherein determining whether to permit the communication session is further based upon whether the second party is a member of the set of calling parties.

32. The method of claim 1, further comprising:
obtaining a plurality of call permission rules corresponding to a plurality of sets of calling parties.

33. The method of claim 32, further comprising:
determining if the second party is a member of at least one of the plurality of sets of calling parties.

34. The method of claim 33, wherein determining whether to permit the communication session is further based upon whether the second party is a member of at least one of the plurality of sets of calling parties.

35. A method of conveying location information of one or more potential session participants to a communication session, comprising:
receiving a request from a second party to initiate a communication session with at least a first party;
determining location information associated with the second party, wherein the second party corresponds to a calling party;
generating a message for announcing the communication session to at least the first party;
configuring the message to include the determined location information associated with the second party; and
sending the configured message including the location information associated with the second party to at least the first party.

36. The method of claim 35, wherein the communication session is one or more of a call, a data transport session, a unicast communication, a multicast communication, a direct session and a group communication session including three or more potential session participants.

37. The method of claim 35, wherein the communication session corresponds to a call and the first party corresponds to a called party.

38. The method of claim 35, wherein the communication session corresponds to a group communication session that includes three or more potential session participants, and
the second party corresponds to a session participant other than an originator of the communication session from which the request is received.

39. The method of claim 35, wherein the received request is a call request message, and the generated message corresponds to a call announce message.

40. The method of claim 39, wherein the determining extracts the location information from the call request message, or from one or more location update messages.

41. The method of claim 35, wherein the receiving, the determining, the generating, the configuring and the sending are each performed at an application server.

42. The method of claim 35, further comprising:
receiving an accept or deny from the first party based on the location information associated with the second party.

43. An apparatus for determining whether to permit a call to an access terminal of a first party, comprising:
means for receiving a message for a communication session between the first party and a second party;
means for obtaining location information associated with a call permissions rule set, the call permissions rule set including at least one rule related to whether the communication session between the first party and the second party is permissible, the at least one rule including one or more location-based rules;
means for obtaining location information associated with the second party; and
means for determining whether to permit the communication session with the access terminal of the first party based on the obtained location information associated with the call permissions rule set and the obtained location information associated with the second party,
wherein the second party corresponds to a calling party.

44. The apparatus of claim 43, wherein the communication session is one or more of a call, a data transport session, a unicast communication, a multicast communication, a direct session or a group communication session including three or more potential session participants.

45. The apparatus of claim 43, wherein the location information associated with the second party is obtained from the received message.

46. The apparatus of claim 43, wherein the location information associated with the second party is obtained from a location database.

47. The apparatus of claim 46, further comprising:
means for receiving one or more location updates from the second party that indicate location information associated with the second party; and
means for updating the location database based on the received location updates.

48. The apparatus of claim 47, wherein the received message includes a location update.

49. The apparatus of claim 43, wherein the location information associated with the call permissions rule set corresponds to location criteria that is used to determine whether the at least one rule of the call permissions rule set is satisfied.

50. The apparatus of claim 49, wherein the means for determining whether to permit the communication session includes means for comparing the location information associated with the call permissions rule set with the location information associated with the second party to determine whether to permit the communication session.

51. The apparatus of claim 43, wherein the location information associated with the second party includes one or more of a geographic coordinate of the second party, a building indicator at which the second party is located, or a geographic range that includes the second party and an address at which the second party is located.

52. A computer-readable storage medium comprising instructions, which, when executed by a machine, cause the machine to perform operations for determining whether to permit a call to an access terminal of a first party, the instructions comprising:
instructions to receive a message for a communication session between the first party and a second party;
instructions to obtain location information associated with a call permissions rule set, the call permissions rule set including at least one rule related to whether the communication session between the first party and the second party is permissible, the at least one rule including one or more location-based rules;
instructions to obtain location information associated with the second party; and
instructions to determine whether to permit the communication session with the access terminal of the first party based on the obtained location information associated with the call permissions rule set and the obtained location information associated with the second party,
wherein the second party corresponds to a calling party.

53. The computer-readable storage medium of claim 52, wherein the communication session is one or more of a call, a data transport session, a unicast communication, a multicast communication, a direct session or a group communication session including three or more potential session participants.

54. The computer-readable storage medium of claim 52, wherein the location information associated with the second party is obtained from the received message.

55. The computer-readable storage medium of claim 54, wherein the location information associated with the second party is obtained from a location database.

56. The computer-readable storage medium of claim 55, further comprising: instructions to receive one or more location updates from the second party that indicate location information associated with the second party; and
instructions to update the location database based on the received location updates.

57. The computer-readable storage medium of claim 56, wherein the received message includes a location update.

58. The computer-readable storage medium of claim 52, wherein the location information associated with the call permissions rule set corresponds to location criteria that is used to determine whether the at least one rule of the call permissions rule set is satisfied.

59. The computer-readable storage medium of claim 58, wherein the instructions to determine whether to permit the communication session includes instructions to compare the location information associated with the call permissions rule set with the location information associated with the second party to determine whether to permit the communication session.

60. The computer-readable storage medium of claim 52, wherein the location information associated with the second party includes one or more of a geographic coordinate of the second party, a building indicator at which the second party is located, or a geographic range that includes the second party and an address at which the second party is located.

61. The computer-readable storage medium of claim 52, wherein the location information associated with the call permissions rule set includes one or more of a geographic coordinate, a building indicator, or a geographic range and an address.

62. An apparatus for determining whether to permit a call to an access terminal of a first party, comprising:
logic configured to receive a message for a communication session between the first party and a second party;
logic configured to obtain location information associated with a call permissions rule set, the call permissions rule set including at least one rule related to whether the communication session between the first party and the second party is permissible, the at least one rule including one or more location-based rules;
logic configured to obtain location information associated with the second party; and
logic configured to determine whether to permit the communication session with the access terminal of the first party based on the obtained location information associated with the call permissions rule set and the obtained location information associated with the second party,
wherein the second party corresponds to a calling party.

63. The apparatus of claim 62, wherein the communication session is one or more of a call, a data transport session, a unicast communication, a multicast communication, a direct session or a group communication session including three or more potential session participants.

64. The apparatus of claim 62, wherein the location information associated with the second party is obtained from the received message.

65. The apparatus of claim 64, wherein the location information associated with the second party is obtained from a location database.

66. The apparatus of claim 65, further comprising:
logic configured to update the location database based on received location updates.

67. The apparatus of claim 66, wherein the received message includes a location update.

68. The apparatus of claim 62, wherein the location information associated with the call permissions rule set corresponds to location criteria that is used to determine whether the at least one rule of the call permissions rule set is satisfied.

69. The apparatus of claim 68, wherein the logic configured to determine whether to permit the communication session includes logic configured to compare the location information associated with the call permissions rule set with the location information associated with the second party to determine whether to permit the communication session.

70. The apparatus of claim 62, wherein the location information associated with the second party includes one or more of a geographic coordinate of the second party, a building indicator at which the second party is located, or a geographic range that includes the second party and an address at which the second party is located.

71. The apparatus of claim 62, wherein the location information associated with the call permissions rule set includes one or more of a geographic coordinate, a building indicator, or a geographic range and an address.

72. An apparatus for conveying location information of one or more potential session participants to a communication session, comprising:
  means for receiving a request from a second party to initiate a communication session with at least a first party;
  means for determining location information associated with the second party, wherein the second party corresponds to a calling party;
  means for generating a message for announcing the communication session to at least the first party;
  means for configuring the message to include the determined location information associated with the second party; and
  means for sending the configured message including the location information associated with the second party to at least the first party.

73. The apparatus of claim 72, further comprising:
  means for receiving an accept or deny from the first party based on the location information associated with the second party.

74. An apparatus for conveying location information of one or more potential session participants to a communication session, comprising:
  logic configured to receive a request from a second party to initiate a communication session with at least a first party;
  logic configured to determine location information associated with the second party, wherein the second party corresponds to a calling party;
  logic configured to generate a message for announcing the communication session to at least the first party;
  logic configured to configure the message to include the determined location information associated with the second party; and
  logic configured to send the configured message including the location information associated with the second party to at least the first party.

75. The apparatus of claim 74, further comprising:
  logic configured to receive an accept or deny from the first party based on the location information associated with the second party.

76. A computer-readable storage medium comprising instructions, which, when executed by a machine, cause the machine to perform operations for conveying location information of one or more potential session participants to a communication session, the instructions comprising:
  instructions to receive a request from a second party to initiate a communication session with at least a first party;
  instructions to determine location information associated with the second party, wherein the second party corresponds to a calling party;
  instructions to generate a message for announcing the communication session to at least the first party;
  instructions to configure the message to include the determined location information associated with the second party; and
  instructions to send the configured message including the location information associated with the second party to at least the first party.

77. The computer-readable storage medium of claim 76, further comprising:
  instructions to receive an accept or deny from the first party based on the location information associated with the second party.

78. A method of determining whether to permit a call to an access terminal of a first party, comprising:
  receiving a message for a communication session between a the first party and a second party, wherein the first party corresponds to a non-initiating party and the second party corresponds to an initiating party;
  obtaining location information associated with a call permissions rule set, the call permissions rule set including at least one rule related to whether the communication session between the first party and the second party is permissible, the at least one rule including one or more location-based rules;
  obtaining location information associated with the second party; and
  determining whether to permit the communication session with the access terminal of the first party based on the obtained location information associated with the call permissions rule set and the obtained location information associated with the second party.

* * * * *